United States Patent [19]
Honma et al.

[11] Patent Number: 5,208,097
[45] Date of Patent: May 4, 1993

[54] BASE FABRIC FOR AIR BAG

[75] Inventors: Hiroshi Honma; Takehiko Sakai; Takao Matsushita, all of Chiba, Japan

[73] Assignee: Dow Corning Toray Silicone Co., Ltd., Tokyo, Japan

[21] Appl. No.: 965,502

[22] Filed: Oct. 23, 1992

[30] Foreign Application Priority Data

Oct. 31, 1991 [JP] Japan ................................. 3-355404

[51] Int. Cl.$^5$ .............................................. B32B 7/00
[52] U.S. Cl. .................... 428/266; 280/728; 428/36.1; 428/36.8; 428/265; 428/267
[58] Field of Search ...................... 428/266, 267, 36.1, 428/36.8, 265; 280/728

[56] References Cited

U.S. PATENT DOCUMENTS

| | | | |
|---|---|---|---|
| 4,814,214 | 3/1989 | Tomita et al. | 428/36.8 |
| 4,921,735 | 5/1990 | Bloch | 428/34.9 |
| 5,110,666 | 5/1992 | Monzel et al. | 428/36.8 |

*Primary Examiner*—James J. Bell
*Attorney, Agent, or Firm*—Sharon K. Severance

[57] ABSTRACT

This invention pertains to a base fabric for an air bag coated with a silicone rubber which has excellent properties of folding for storage and sewing fabrication in addition to excellent adhesion to withstand impact with extension, especially extension at a high temperature.

The surface of the fabric comprised of a polyamide fiber or polyester fiber is (I) coated with a thermosetting organopolysiloxane product comprised of (A) an unvulcanized organopolysiloxane rubber containing 2 or more alkenyl groups in a molecule, (B) silica in the form of a very fine powder, (C) an organopolysiloxane comprised of at least 5 silicon atoms in the main chain and further containing 1 or more trialkoxysilyl groups bonded with a silicon atom through a carbon atom, 1 or more epoxyalkyl groups and 3 or more hydrogen atoms bonded with a silicon atom, (D) a catalyst for the hydrosilylation reaction and (E) an organic solvent; followed by (II) a hardening process by heating.

4 Claims, No Drawings

BASE FABRIC FOR AIR BAG

BACKGROUND OF THE INVENTION

Recently, air bags have been applied in practical use as a safety device for the protection of the driver and passengers in a motor car. In general, such air bags are composed of a base fabric prepared by coating a nylon fabric with chloroprene rubber. There are weaknesses with the chloroprene coated fabric in that it is difficult to produce light-weight air bags using this fabric and the physical properties of it deteriorate with time. Recently, a proposal was made for a base fabric of air bags coated with silicone rubber in Japanese Kokai Patent Application No. Sho 63[1988]-78744. Although this base fabric for air bags coated with silicone rubber has excellent characteristics at high temperatures and its light weight is made possible by coating a thin membrane, the silicone rubber is insufficient in its adhesion to the base fabric, so that the base fabric coated with silicone rubber has the grave weakness of not being able to withstand impact with extension, especially extension at a high temperature. Furthermore, an emphasis has been placed on the property of an air bag being folded neatly for storage; fabric made of a polyamide fiber has become popular because of its excellent properties in this respect. However, it has become clear that severe curling occurs on the surface of this type of fabric for an air bag after silicone coating, making the sewing procedure difficult.

After intensive studies to solve the aforementioned problems, we discovered that a silicone rubber product containing an organohydrogen polysiloxane with a specific epoxy group adheres tightly to fabrics of a polyamide fiber or a polyester fiber and an excellent base fabric for an air bag could be produced by the polyamide fiber fabric or polyester fabric after coating and hardening using this silicone rubber product, without the aforementioned problem of curling. This invention is the result of the discovery.

The aim of this invention is to offer a base fabric for an air bag with excellent properties with respect to folding for storage and fabrication for sewing and adhesion strength to withstand the impact with extension, especially extension at a high temperature.

SUMMARY OF THE INVENTION

This invention is concerned with the base fabric for an air bag used in air bags installed in automobiles and other vehicles. In more detail, this invention is concerned with a base fabric for an air bag that installed in cars and others vehicles wherein the base fabric is comprised of a polyamide fiber or polyester fiber coated with a thermosetting organopolysiloxane product comprised of (A) an unvulcanized organopolysiloxane rubber containing 2 or more alkenyl groups in a molecule; (B) fine silica powder; (C) an organopolysiloxane comprised of at least 5 silicon atoms in the main chain and further containing 1 or more trialkoxysilyl groups bonded with a silicon atom through a carbon atom, 1 or more epoxyalkyl groups and 3 or more hydrogen atoms bonded with a silicon atom; (D) catalyst for hydrosilylation reaction and (E) an organic solvent. The base fabric for an air bag of this invention has an adhesion strength to withstand extension, especially against impact with extension at a high temperature and excellent properties for storage when folded and for fabrication by sewing.

THE INVENTION

The aforementioned aims of this invention can be achieved by coating a surface of a fabric comprised of a polyamide fiber or polyester fiber with a thermosetting organopolysiloxane product comprised of:

(A) an unvulcanized organopolysiloxane rubber containing 2 or more alkenyl groups in a molecule;
(B) a fine silica powder;
(C) an organopolysiloxane comprised of at least 5 silicon atoms in the main chain and further containing 1 or more trialkoxysilyl groups bonded with a silicon atom through a carbon atom, 1 or more epoxyalkyl groups and 3 or more hydrogen atoms bonded with a silicon atom;
(D) catalyst for hydrosilylation reaction; and
(E) an organic solvent followed by heating of the coated fabric for hardening of the thermosetting organopolysiloxane product.

The fabric used in this invention, which is comprised of a polyamide fiber or polyester fiber, is commonly known for its use in air bags and there is no special restriction on the type of fabric used. However, it is most preferable to use a nylon 6,6 fabric at 300-500 denier.

This invention is characterized by the thermosetting organopolysiloxane product that is coated on the polyamide or polyester fiber. Component (A), the unvulcanized organopolysiloxane rubber, is the main component of this product. The unvulcanized organopolysiloxane rubber must contain 2 or more alkenyl groups in the molecule in order for the product to form silicone rubber coating membrane with rubber-like elasticity after hardening.

Such an unvulcanized organopolysiloxane rubber is a virtually straight chain of organopolysiloxane represented by general formula (1),

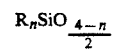

$$R_n SiO_{\frac{4-n}{2}}$$

where R is selected from an alkyl group such as a methyl, ethyl or propyl group, an alkenyl group such as a vinyl or allyl group, an aryl group such as a phenyl group or a halogenated alkyl group such as a 3,3,3-trifluoropropyl group as a monovalent hydrocarbon group with or without a substituted group and n has the value of from 1.9-2.1. The degree of polymerization of this organopolysiloxane is not particularly limited if it is in the appropriate range, commonly referred to as unvulcanized organopolysiloxane rubber range in this field of business. Usually, the degree of polymerization is 1,000-20,000.

Component (A) may be further exemplified by a dimethylpolysiloxane with both terminals blocked with dimethylvinylsiloxy groups, a dimethylsiloxanemethylvinylsiloxane copolymer with both terminals blocked with dimethylvinylsiloxy groups and a dimethylsiloxanemethylphenylsiloxane copolymer with both terminals blocked with a dimethylvinylsiloxy group.

Component (B), the fine silica powder, may be any commonly known silica which is useful as a reinforcing filler of a silicone rubber, without restrictions on the type. Component (B) may be exemplified by, but not limited to, fumed silica and precipitated silica. It is preferable to use an ultrafine silica powder with a diameter of 50 mµ or less and a specific surface area of 50 m2/g or more. It is even more preferable to use a very fine silica powder with its surface treated with organosilane, organosilazane or diorganocyclopolysiloxane. Such treated fine silica powders are commercially available or may be produced by methods known in the art. The fine silica powder is present in the thermosetting organopolysiloxane product from 5 to 100 parts by weight per 100 parts by weight of component (A).

Component (C) is an organopolysiloxane comprised of at least 5 silicon atoms in the main chain and further containing 1 or more trialkoxysilyl groups bonded with a silicon atom through a carbon atom, 1 or more epoxyalkyl groups and 3 or more hydrogen atoms bonded with a silicon atom. This is an indispensable component in that it acts as the crosslinking agent for the organopolysiloxane, component (A). Organopolysiloxane, Component (C) also improves the adhesion of the product to the fabric of polyamide fiber or polyester fiber.

Component (C) contains at least 1 trialkoxysilyl group bonded with a silicon atom through a carbon atom. Suitable trialkoxysilyl groups may be exemplified by, but not limited to, a trimethoxysilyl group, a triethoxysilyl group, a triisopropoxysilyl group and a tributoxysilyl group. Suitable groups for bonding the trialkoxysilyl group to the silicon include, but are not limited to alkylene groups, such as methylene, ethylene, propylene and butylene groups. Component (C) further contains at least 1 epoxyalkyl group. The epoxyalkyl group of the organopoloysiloxane, (C) may be exemplified by, but not limited to, a glycidoxypropyl group and a β-(3,4-epoxycyclohexyl)ethyl group.

For this organopolysiloxane product to form a net-like structure easily, it is necessary that component (C) contains 3 or more hydrogen atoms bonded with a silicon atom and that there are 5 or more silicon atoms in the main chain. Component (C), can be further exemplified by, but not limited to, the following compounds:

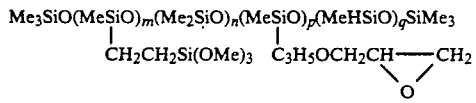

where m and p are integers of 1 or greater, n is 0 or an integer of 1 or greater, q is an integer of 3 or greater, and Me is a methyl group;

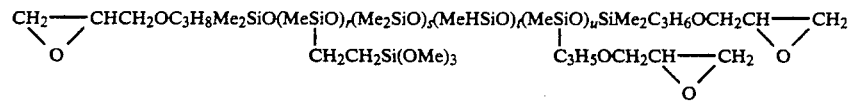

where r and u are integers of 1 or greater, s is 0 or an integer of 1 or greater, t is an integer of 3 or greater and Me is a methyl group; and

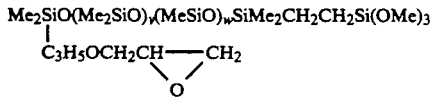

where v is 0 or an integer of 1 or greater, w is an integer of 3 or greater and Me is a methyl group.

Component (C), the organopolysiloxane, is added so that the molar ratio of the hydrogen atom bonded with the silicon atom in component (C) to the alkenyl group bonded with the silicon atom in component (A) is 0.6:1 to 20:1; this usually means 0.1-10 parts by weight for component (C) with respect to 100 parts by weight of component (A).

A thermosetting organopolysiloxane product containing an organohydrogen polysiloxane, (C), has characteristically a very rapid speed of manifestation of adhesion. For example, a silicone rubber, which did not contain component (C) was mostly hardened under the conditions of 180° C. for 5 minutes in a conventional production method of a base fabric coated with a silicone rubber to be used for an air bag. On the other hand, it is possible to obtain sufficient adhesion under the conditions of 180° C. for 20 seconds when component (C), the organohydrogen polysiloxane, is used as the crosslinking agent.

As component (D), the catalyst for the hydrosilylation reaction, transition metal catalysts have been commonly known as substances with catalytic activity for hydrosilylation. Examples of useful catalysts include, but are not limited to platinum chloride, alcohol-modified platinum chloride, platinum chloride-olefin complexes, complexes between platinum or platinum chloride and vinylsiloxane, thermoplastic resin particles containing these platinum catalysts, rhodium compounds and palladium compounds. Component (D) is used at 0.1-500 parts by weight as the metal with respect to 1,000,000 parts by weight of component (A).

An organic solvent as component (E) is used, if necessary, to adjust the viscosity of the product for convenience of coating the thermosetting organopolysiloxane product. Suitable solvents include, but are not limited to, toluene, xylene, heptane and volatile oils for rubber. The volume of the solvent differs depending on the coating machine; however, it is usually at 1,000 parts by weight or less with respect to 100 parts by weight of component (A). One skilled in the art will be able to determine the proper amount of solvent necessary to produce a suitably viscosity in the thermosetting organopolysiloxane product.

The organopolysiloxane product is composed of components (A)–(E) described above. However, if a still greater adhesion is required, it is preferable to add a small amount of methyl hydrogen polysiloxane as component (F) to the aforementioned components (A)–(E). Component (F) acts as an auxiliary to component (C) to further increase the adhesion to the fabric of polyamide fiber or polyester fiber, if added in a small amount. Component (F) may be further exemplified by, but not limited to, a methyl hydrogen polysiloxane with both terminals blocked with trimethylsiloxy groups and methyl hydrogen polysiloxane with both terminals blocked with dimethyl hydrogen siloxy groups, as well as methyl hydrogen cyclopolysiloxane. This component is added at 0.1–3 parts by weight with respect to 100 parts by weight of component (A). If component (F) is used at more than 3 parts by weight, no further improvement is achieved and furthermore, the softness of the coated fabric is decreased.

The thermosetting organopolysiloxane product of this invention is readily produced by uniformly mixing the aforementioned components (A)–(E) or (A)–(F). In addition to components (A)–(E) or components (A)–(F) a reaction rate retarding agent for the hydrosilylation reaction, a pigment and/or an agent for heat resistance may optionally be added, if necessary. The agent for retardation of the rate of the hydrosilylation reaction can be exemplified by, but not limited to, acetylene alcohol, enyne compound and benzotriazole. Useful pigments, include but are not limited to titanium dioxide, zinc oxide and carbon black. Useful agents for heat resistance include but are not limited to, indian red, rare earth oxides and cerium silanolate.

The base fabric for an air bag of this invention can be produced by coating the aforementioned organopolysiloxane product on a fabric of a polyamide fiber or polyester fiber, followed by heating for hardening in a hot-air drying oven or other heating means. The preferred condition for heating to induce hardening is 150°–200° C.

Since the base fabric for an air bag of this invention is produced by coating a fabric of polyamide fiber or polyester fiber with an organopolysiloxane product composed of components (A)–(E), followed by a hardening process by heating, the fabric has the characteristics of excellent properties of folding for storage and sewing fabrication in addition to excellent adhesion to withstand impact with extension, especially extension at a high temperature.

So that those skilled in the art can understand and appreciate the invention taught herein, the following examples are presented, being it understood that these examples should not be used to limit the scope of this invention found in the claims attached hereto.

In the application examples, the term "parts" indicates "parts by weight." The viscosity refers to the value at 25° C. with cSt indicating centistokes. Me indicates a methyl group and Vi indicates a vinyl group.

In the following examples the properties of the base fabric for the air bag were evaluated as follows:

(a) Adhesion

Using a Scott crumbling tester, a crumbling test was performed 1,000 times at a pressure of 2 kgf, followed by macroscopic inspection of the exfoliation of the silicone-rubber-coated membrane on the surface of fabric.

(b) Softness

Hardness-softness was measured by the cantilever method (45° C.) in the longitudinal and transverse direction, with the rubber-coated side facing upward.

(c) Curling property

A piece of coated fabric 20 cm2 was cut out and left at room temperature, with the coated surface facing upward; 3 hours later, the degree of curling was evaluated macroscopically.

(d) Air bag inflation test

Air bags were inflated instantaneously by blowing hot air in at 170°–180° C. under a pressure of 7–8 kg/cm2 to observe macroscopically the presence or absence of exfoliation of the silicone rubber membrane.

EXAMPLE 1

100 parts of unvulcanized dimethylsiloxanemethylvinylsiloxane copolymer rubber composed of dimethylsiloxane units at 99.85 mol % and methylvinylsiloxane units at 0.15 mol %, with both terminals blocked with dimethylvinylsiloxy groups (degree of polymerization of 3,000); 5.0 parts of dimethylpolysiloxane with both terminals blocked with silanol groups and with a viscosity of 60 cSt at 25° C. and 25 parts of fumed silica with a specific surface area of 200 m2/g were added to a kneader-mixer to be kneaded to uniformity with heating to obtain a rubber base. 70 parts of toluene were added to 30 parts of this rubber base, which was dissolved by stirring at room temperature. To 100 parts of this dispersion, the following were added: 1.0 part of methyl hydrogen polysiloxane containing alkoxysilyl groups and epoxy groups represented by the empirical molecular formula:

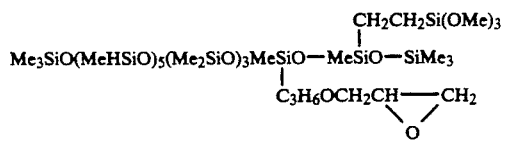

where Me is a methyl group; 0.5 part of a complex of platinum chloride and divinyltetramethyldisiloxane (platinum concentration 0.4 wt %) and 0.5 part of 3,5-dimethyl-1-hexine-3-ol as the retardation agent of the hydrosilylation reaction followed by mixing to homogeneity. The viscosity of this dispersion was 60,000 cSt. This the dispersion was coated on a fabric of nylon 6.6 (420 denier) for an air bag and the following measurements were carried out: adhesion strength, curling property of the base fabric and softness. The coating on the nylon 6.6 fabric for air bag production was carried out with a Kona coater so that the silicone rubber product was present at a surface density of 40–50 g/m2. The coated fabric was dried with forced air in an oven at 120° C. with air pumped in continuously for 2 min and then heated for hardening continuously in an oven at 180° C. for 5 min to produce the base fabric for the air bag. The results of the evaluation are shown in Table I.

COMPARATIVE EXAMPLE 1

A silicone rubber coating agent was prepared similarly as in Example 1 except using 1.0 part of the cross-linking agent represented by the empirical molecular formula $Me_3SiO(MeHSiO)_6(Me_2SiO)_4SiMe_3$ instead of methyl hydrogen polysiloxane with the alkoxysilyl groups and epoxy groups and adding 1.0 part of -glycidoxypropyltrimethoxysilane as the agent for increasing adhesion. The base fabric for the air bag was prepared by coating this agent on nylon 6,6 fabric similarly as in Application Example 1 to determine the properties. The results of the evaluation are also shown in Table I.

TABLE I

| | Example 1 | Comparative Example 1 |
|---|---|---|
| Adhesion (Scott crumbling test) | Acceptable | Acceptable |
| Softness (cantilever method, 45° C.) | 74 × 85 mm | Could not be measured because of severe curling |
| Property of curling (Macroscopic observation) | Good | Not good* |
| Airbag inflation test | Acceptable | Acceptable |

*Not good = the piece curled up with the coated surface inward.

EXAMPLE 2

A base fabric for an air bag was prepared similarly as in Example 1 except using a fabric of polyester fiber instead of nylon 6,6 for the air bag (420 denier) to determine the properties.

tain a base fabric for an air bag. The properties were measured similarly as in Example 1 and the results are shown in Table III.

TABLE III

| Example | 3-1 | 3-2 | 3-3 | 3-4 | 3-5 |
| --- | --- | --- | --- | --- | --- |
| Conditions for Hardening | minute | minute | second | minute | second |
| Adhesion (Scott crumbling test) | acceptable | acceptable | acceptable | acceptable | acceptable |
| Softness (cantilever method, 45° C.) | 73 × 87 mm | 72 × 85 mm | 72 × 86 mm | 75 × 88 mm | 73 × 86 mm |
| Curling (Macroscopic observation) | Good | Good | Good | Excellent | Good |
| Airbag inflation test | acceptable | acceptable | acceptable | acceptable | acceptable |

COMPARATIVE EXAMPLE 2

A base fabric for an air bag was prepared similarly as in Comparative Example 1 except using a fabric of polyester fiber instead of nylon 6,6 for the air bag (420 denier) to determine the properties. The results of these measurements are shown in Table II.

TABLE II

|  | Example 2 | Comparative Example 2 |
| --- | --- | --- |
| Adhesion (Scott crumbling test) | Acceptable | Slight exfoliation |
| Softness (cantilever method, 45°) | 72 × 83 mm | Measurement impossible because of severe curling |
| Curling property (macroscopic evaluation) | Fair | Not Good |

*Fair = the four corners of the test piece were bent slight to the coated side.

EXAMPLE 3

A dispersion product prepared similarly as in Example 1 except using 2.5 parts instead of 5.0 parts of dimethylpolysiloxane, with both terminals blocked with silanol groups, 25 parts of dimethyldichlorosilane-treated silica powder with a specific surface area of 100 m2/g instead of 25 parts of fumed silica with a specific surface area of 200 m2/g and adding 0.25 part of adhesion auxiliary of methyl hydrogen polysiloxane, with both terminals blocked with trimethylsiloxy groups (content of hydrogen atoms bonded to silicon atoms at 1.5 wt%) and with a viscosity of 25 cSt at 25° C. The viscosity of this dispersion was 30,000 cSt. A fabric of nylon 6,6 (420 denier) was coated with this dispersion similarly as in Example 1, followed by continuously drying at 120° C. for 2 min and heating for hardening in an oven under the conditions listed in Table III to obtain a base fabric for an air bag. The properties were measured similarly as in Example 1 and the results are shown in Table III.

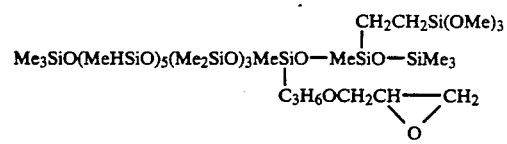

What is claimed is:

1. A base fabric for air bags produced by (I) coating a surface of a fabric comprised of a polyamide fiber or polyester fiber with a thermosetting organopolysiloxane product comprised of
   (A) an unvulcanized organopolysiloxane rubber containing 2 or more alkenyl groups in a molecule;
   (B) a fine silica powder;
   (C) an organopolysiloxane comprised of at least 5 silicon atoms in the main chain and further containing 1 or more trialkoxysilyl groups bonded with a silicon atom through a carbon atom, 1 or more epoxyalkyl groups and 3 or more hydrogen atoms bonded with a silicon atom;
   (D) a catalyst for hydrosilylation reaction and
   (E) an organic solvent
followed by (II) heating the coated fabric for hardening.

2. A base fabric for an air bag as claimed in claim 1 in which the thermosetting organopolysiloxane product is further comprised of (F) a methyl hydrogen polysiloxane.

3. A base fabric for an air bag as claimed in claim 1 in which the polyamide fiber is nylon 6,6.

4. A base fabric for an air bag as claimed in claim 1 wherein Component (C) of the thermosetting organopolysiloxane product is an organopolysiloxane having the formula of